H. FIELDER.
VALVE.
APPLICATION FILED MAY 5, 1914.

1,124,881.

Patented Jan. 12, 1915.
2 SHEETS—SHEET 1.

WITNESSES

INVENTOR
HOWARD FIELDER,
BY
ATTORNEYS

UNITED STATES PATENT OFFICE.

HOWARD FIELDER, OF FRANKLIN, OHIO, ASSIGNOR OF ONE-HALF TO DIN W. FIELDER, OF SPRINGFIELD, OHIO.

VALVE.

1,124,881. Specification of Letters Patent. Patented Jan. 12, 1915.

Application filed May 5, 1914. Serial No. 836,470.

*To all whom it may concern:*

Be it known that I, HOWARD FIELDER, a citizen of the United States, and a resident of Franklin, in the county of Warren and State of Ohio, have invented a new and useful Improvement in Valves, of which the following is a specification.

My invention is an improvement in valves, and has for its object to provide a valve for interposition in a water supply system for controlling the operation of a pump operated by the water from a city main or other source of supply for supplying soft water from a cistern or other container to fixtures, wherein the valve is controlled by the pressure of the said soft water.

Figure 1:
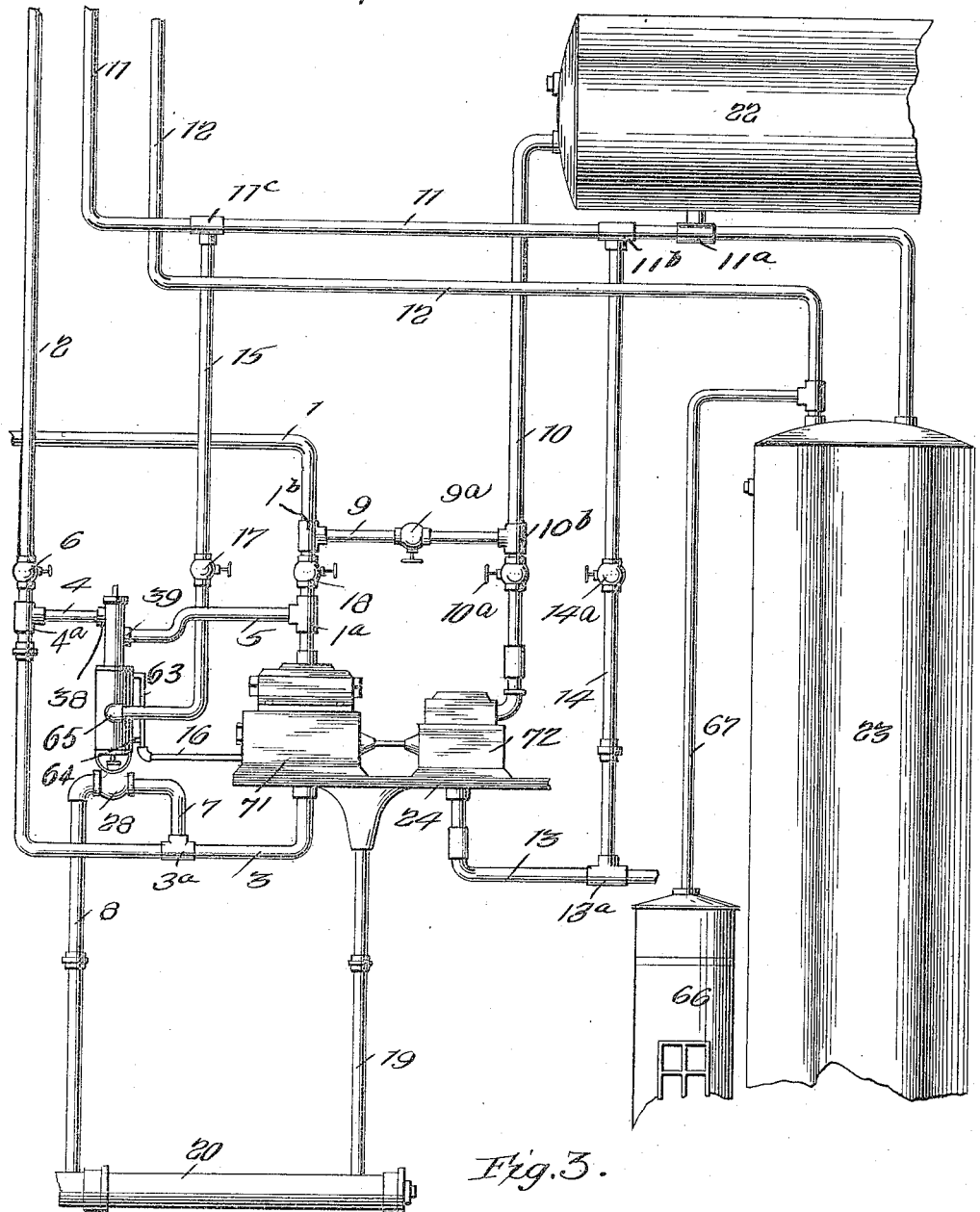
Figure 3:
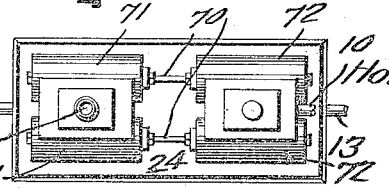
Figure 2:
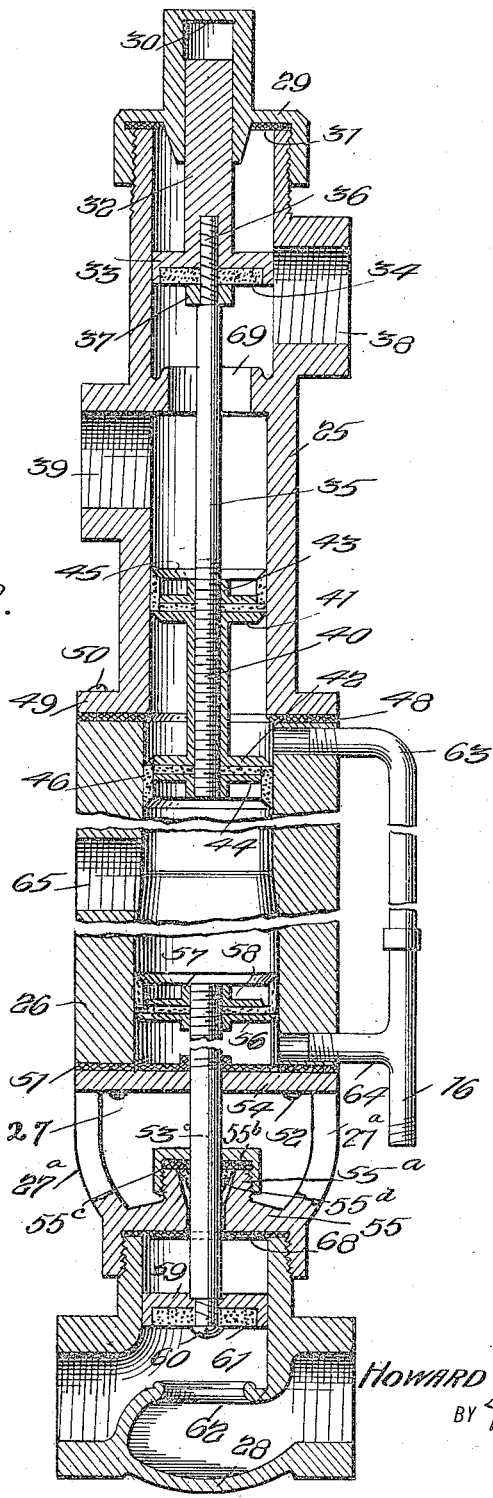

In the drawings:—Figure 1 is a diagrammatic view of the system, Fig. 2 is a vertical section of one arrangement of the controlling valve for the system, Fig. 3 is a diagrammatic top plan view of the pump and its connections.

The present embodiment of the invention comprises a controlling device for water systems, wherein the said device is arranged to control the flow of the water through the system. The controlling device referred to hereafter as a valve is in fact a series of valves.

Referring to Fig. 1 of the drawing, it will be seen that the pump supported by the base 24, receives water from the city main or other source of supply by means of a pipe 1, the said pipe leading from the main to the valve chamber, wherein valve mechanism is arranged for directing the water through the various ports to operate the pistons in the cylinders to reciprocate the said pistons, and the pistons are connected directly to plungers in the pump cylinders at the right of the base, and to operate the said plungers to cause the pump to draw water from the cistern or other source of water and to pass from the pump cylinders to a compression tank or other place of storage.

A pipe 2 leads from the pump, that is, from the cylinders which operate the pump to the fixtures which are to be supplied with city water. It will be understood that after the water has operated the pistons in the cylinders, it then passes by way of the pipe 3 to the pipe 2, and to the fixtures. The pipe 3 provides a by-pass for the discharge or used water from the pump to the fixture line, and a pipe 4 leads from the head of the controlling valve to be later described to the pipe 2, the said pipe 4 communicating with the lateral branch of a T $4^a$, which connects the pipes 2 and 3, and a valve 6 is interposed in the fixture line pipe 2 adjacent to the T $4^a$ and on the opposite sides of the T from the pipe 3.

Another pipe 5 leads from the pipe 1 to the head of the controlling valve, a T $1^a$ being inserted in the pipe 1, and the pipe 5 is connected with the lateral branch of the T. A valve casing 18 is interposed in the pipe 1 on the opposite side of the T $1^a$ from the pump, and a second T $1^b$ is interposed in the pipe 1 on the opposite side of the valve casing 18 from the T $1^a$. A T $3^a$ is arranged in the pipe 3 between the pump and the T $4^a$, and an elbow 7 connects the T $3^a$ with a valve casing, to be later described, arranged at the lower end of the controlling valve and forming a part thereof.

The casing 28 just mentioned is connected to the other portions of the casing of the controlling valve in a manner to be presently described, and a pipe 8 leads from the end of said casing 28 remote from the pipe 3 to the sewer connection 20. With this arrangement the discharge water from the sewer may be passed through the pipe 3 to the fixtures, by way of the pipe 2, or to the sewer connection by way of the pipe 7 and 8, the flow of the water being controlled by the valve in the casing 28.

A pipe 9 leads from the lateral branch of the T $1^b$ to a pipe 10, which is the discharge pipe from the pump cylinders to the compression tank 22, and a valve casing $9^a$ is interposed in the length of the pipe 9, for controlling the flow of the water through the pipe. The pipe 9 is a by-pass from the pipe 1 to the pipe 10, and the valve $9^a$ is provided for closing the by-pass when desired. The pipe 9 connects the lateral branch of the T $1^b$ with the lateral branch of a T $10^b$, interposed in the length of the pipe 10. A valve casing $10^a$ is interposed in the pipe 10 between the pump cylinders and the T $10^b$, and between the storage tank and the pump.

In practice the tank 22 should have a capacity of approximately 30 gallons, and a hot water tank 23 which is connected to the compression tank in a manner to be presently described, would have approximately the same capacity or preferably a somewhat larger capacity. A pipe 11 leads from the storage tank 22 and the hot water tank 23 to the soft water fixtures, that is, to the fixtures where it is desired to supply cold soft water. The pipe 11 leads from the upper end of the tank 23, and a T 11ª is interposed in the length of the pipe, for connecting the said pipe with the compression tank 22. A pipe 12 supplies the soft water fixtures with hot water, the said pipe leading from the top of the hot water tank as shown.

The pump for the soft water is connected to a source of soft water supply, as for instance, a cistern or other place of storage, by means of a suction pipe 13, and a pipe 14 connects the pipe 11 with the pipe 13, the said pipe 14 forming a by-pass or drain pipe, for permitting the compression tank and the pipes 11 and 12 to be drained into the cistern when desired. This pipe 14 connects the lateral branch of a T 11ᵇ arranged in the pipe 11, with a T 13ª arranged in the pipe 13, and a valve casing 14ª is interposed in the length of the pipe 14, for controlling the flow of water through the said pipe. When it is desired to drain the water from the compression tank and the fixture pipes 11 and 12 it is only necessary to open the valve 14ª.

A pipe 15 leads from the cold water line fixture pipe 11 to the controlling valve, the pipe 15 connecting the lateral branch of a T 11ᶜ, interposed in the pipe 11, with the controlling valve intermediate the ends of the said valve, and a valve casing 17 is interposed in the length of the pipe 15. The pipe 15 communicates with the valve casing, and supplies the water to the valve which controls the operation of the valve. The pipe 15 is merely a pressure pipe through which the water pressure in the pipe 11 and connections is communicated to the valve.

A drip pipe 19 leads from the pump to the sewer connection 20, and a trap of usual construction is arranged in the pipe 20 between the pipe 8 and the sewer proper.

The improved valve shown in Fig. 2, comprises a casing consisting of an upper portion 25, an intermediate portion 26, and a lower portion 27, and a valve casing 28 is connected with the lower end of the portion 27. The upper end of the upper portion 25 of the valve is externally threaded for engagement by a cap 29, the cap having a guide 30, for the valve stem. A packing 31 is arranged between the upper end of the upper portion of the valve and the cap, and a valve rod 32 has its upper end received within the guide.

A piston or plunger 33 is provided at the lower end of the rod 32, and a packing 34 is seated in a cup-shaped depression in the lower face of the plunger. The valve stem 35 has its upper end reduced and threaded as indicated at 36, to engage a threaded opening in the rod 32, and a nut 37 is threaded on to the reduced portion 36 below the packing. The upper portion 25 of the valve is provided with lateral outlets 38 and 39, for connection with the pipes 4 and 5, respectively, and the lower end of the stem 35 is externally threaded, and is engaged by a sleeve 40, the said sleeve fitting over the lower end.

The sleeve 40 is provided with disks 41 and 42, at its respective ends, and follower nuts 43 and 44, respectively, are threaded on to the stem adjacent to the disks 41 and 42. The follower nuts hold cup-shaped packings 45 and 46 in place against the disks 41 and 42, and the plunger or piston constituted by the disk 41, the follower nut 43 and the packing 45 is in the upper portion or hard water portion of the valve casing, while the plunger or piston constituted by the disk 42, the follower nut 44 and the packing 46 is in the intermediate portion of the casing or the cylinder of the valve.

A packing 48 is arranged between the upper end of the portion 26, and a radial flange 49 on the lower end of the upper portion, and screws 50 are passed through the flange and engage the portion 26 to secure the upper portion of the valve to the lower portion. A packing 51 is arranged between the lower end of the intermediate portion 26 of the valve and the upper end of the lower portion 27, and the said portions are held together by screws 52.

A valve stem 53 is arranged at the lower end of the controlling valve, the upper end of the stem passing through a central opening in a diaphragm or head 54, which closes the lower end of the portion 26 of the valve casing. The lower end of the stem extends through a species of packing for sealing the lateral branch of the valve casing 28 around the stem. The upper end of the stem 53 is threaded, and a disk 56 is threaded on to the stem in the bore of the portion 26.

A cup-shaped packing 58 is arranged adjacent to the disk, and a follower nut 57 is threaded on to the disk above the packing, the disk, the packing and the follower nut constituting a plunger or piston in the lower end of the portion 26 of the valve. It will be noticed that below the port 65, the bore of the portion 26 of the valve is of greater size than that above the port, and since the plungers 42—44—46 and 56—57—58 fit the respective portions of the valve, the last-named plunger is of greater diameter than the first-named plunger. Hence the pressure on the lower plunger is greater than the pressure on the upper plunger.

The lower portion 27 of the valve above referred to, comprises the diaphragm 54, which closes the lower end of the portion 26 of the valve, and a diaphragm 55 which closes the upper end of the lateral branch of the valve casing 28, and the said diaphragms are connected by oppositely arranged arms 27ª, so that access may be had to the packing to be presently described.

The packing comprises a nipple 55ª having an opening through which the stem passes, and having a water space at the upper end of the nipple. A cap nut 55ᵇ is threaded on to the upper end of the nipple and closes the water space, and a packing disk 55ᶜ is arranged between the nut and the end of the nipple. A frusto-conical leather washer or ring 55ᵈ is arranged within the water space, the lower small end of the washer fitting the stem, and it will be evident that the water pressure which gains access to the water space will tend to seal the opening around the stem, since the said pressure will tend to force the lower small end of the washer more tightly into contact with the periphery of the stem.

A valve 59 is held to the lower end of the stem 53, by means of a screw 60, and a packing 61 is held in a cup-shaped depression in the lower end of the valve by means of the screw. The plunger constituted by the elements 56—57—58 in the portion 26 of the valve is thus rigidly connected with the valve constituted by the elements 59—60—61 in the valve casing 28, and the valve 59 is designed to coöperate with the seat 62, which is arranged transversely of the T or valve casing 28.

The pipe 7 communicates with one end of the casing 28, and the pipe 8 with the other end. The pipe 16 has two branches, namely, a branch 63 which opens into the portion 26 of the valve casing at the upper end thereof and a branch 64 which opens into said portion at the lower end thereof. The portion 26 is also provided with a port 65 for connection with the pipe 15. Any desired form of heater may be connected with the tank 23, as for instance, the heater 66 shown in Fig. 1, the said heater being connected in the usual manner, one of the connections being indicated at 67.

In practice the portion 25 of the casing will be made of a good quality of red brass, the stems 35 and 53 of bronzed rod, while the cup-shaped packing 45—44 and 58 will be of suitable material, as for instance a good quality of leather. The packings 31, 48, 51 and the packing 68 which is arranged between the valve casing 28 and the portion 27 of the valve, may be of paste board or fiber packing. It is obvious however, that the material of all of the parts depends upon the conditions to be met.

When the soft water pressure through the pipe 15 is reduced at the port 65 to less than 40 pounds, the pressure from the main at the port 39 will force the plunger 41—43—45 downward until the valve 33—34 is seated on the seat 69, which is arranged between the ports 38 and 39. When the pressure at the port 65 increases and passes to or above 40 pounds, it will force the valve stem upward, acting against the plunger 42—44—46, and the valve 33—34 will be lifted from its seat 69. When the water pressure at the port 65 falls below 15 pounds, the valve stem 53 will be lifted by the pressure from the motor, lifting the valve 59—60—61 from its seat 62, so that the motor can discharge through the casing 28, by way of the pipes 3—7 and 8 to the sewer. When the pressure at the port 65 exceeds 15 pounds, the stem 53 will be forced downward, seating the packing 61 on the seat 62. The packing 55 permits the stem 53 to work freely.

It will be evident from the description that no springs are used, neither is a flexible diaphragm necessary. Furthermore no packings are used to interfere with the free smooth movement of the valve stems. No adjustment is required for different pressures for the reason that the valve is entirely automatic in its action. The valve permits the motor to pump on either high or low pressure. When the soft water pressure is high and the main valve is open the water from the main may flow more rapidly to the fixtures. In addition a large compression tank is not necessary. It will be understood that from 15 to 40 pounds pressure, soft water will be stored in the compression tank and in the hot water boiler and at 40 pounds pressure the soft water will force the upper valve open, permitting the water from the main to go by way of the by-pass to the fixtures. The valve will dispense with the necessity of running water through the fixtures until the desired pressure of soft water is attained.

The branch 63 of the pipe 16 is a drip or air pipe as is also the branch 64, and the said pipes carry off any water that may collect between the valves at the ends of the sleeve 40 and between the valve at the upper end of the stem 53 and the packing 51. They also equalize the air pressure. It will be evident from the description that the action of the valve is controlled entirely by the water pressure, and that there are no springs, diaphragms or the like, to get out of order. This is a feature of extreme importance, since the valve can be depended upon to operate properly without attention and to properly regulate the relative flow of the soft and city water. Neither is it necessary to provide for varying pressure since the valve operates in precisely the same manner whatever the pressure. When the soft water pressure is high and the city water valve is opened the city water will flow more rapidly to the fixtures, and the soft water at any time desired can be drawn down until it reaches the lower pressure which relieves the pump allowing it to further supply the soft water until the cistern or other supply might be pumped empty. The improved valve permits the motor to pump precisely the same on low pressure as on high pressure, and no large compression tank is necessary.

The pump arranged on the base or support 24 is of usual construction, consisting of two operating cylinders 71 and two pump cylinders 72. The pump plungers are connected directly to the pistons in the operating cylinders by means of piston rods 70, and the pistons in the operating cylinders are operated by the water through the pipe 1 from the city main. The valves in connection with the cylinders supply water alternately to the ends of the cylinders to reciprocate the pistons, and the water after it has been used is discharged by the pipe 3, to the sewer or to the fixture line in accordance with conditions to be later described. Whenever the pump plungers move in one direction, they draw water through the suction pipe 13 into that end of the cylinders away from which the plungers are moving, forcing water out of the other end of the cylinders through the discharge pipe 10 to the compression tank. On the return stroke, the water just drawn in is forced out and water is drawn into the other end through the suction pipe 13. The specific construction of the pump both as concerns the operating end and the pumping end forms no part of the present invention and for this reason is not more fully shown and described.

To place the system in condition for operation, the valves 6—17—18 and 10$^a$ are opened, and the valves 9$^a$ and 14$^a$ are closed. The system is now ready for operation and the water from the city main flowing through the pipe 1 to the motor cylinders 71 will operate the pistons in the pump cylinders to reciprocate the plungers in the pump cylinders 72. As the plungers in the cylinders 72 reciprocate, soft water will be drawn from the source of supply and supplied to the compression tank 22 from whence it may flow by way of the pipe 11 to the fixtures and to the hot water tank 23. At this time, since there is no pressure in the pipe 15 and at the port 65, the pressure of the city water at the port 39 will force the valve stem 35 downward, the pressure acting against the head 41—45, and will close the valve 33—34 against its seat 69. The pipe 1 is now cut off from the pipe 2, so that the city or dynamic water can no longer flow from the pipe 1 to the pipe 2, by way of the valve, but must flow to the pipe 2 by way of the motor. The motor will be operated the dynamic water reciprocating the pistons in the cylinder, and causing the pump to pump water from the cistern to the compression tank by way of the suction pipe 13 and the discharge pipe 10. The discharge from the pump may flow to the city water fixture line by way of the pipe 3, but there will be no pressure in this line, until the valve 59—61 is closed by the increase of pressure in the compression tank or soft water line. As soon as the soft water pressure is sufficient to close the valve 59—61, the discharge water from the pump will flow to the city fixture line. After the city water lines are filled the water will pass into the sewer, by way of the pipes 7 and 8, the valve 59—61 being open until the pressure reaches 15 pounds. When the pressure in the pipe 15 and at the port 65 of the controlling valve attains 40 pounds, the stem 35 will be lifted, opening the valve 33—34, and permitting the city water to flow from the pipe or by means of the pipes 5 and 4 to the fixtures, thus stopping the operation of the pump. Whenever the pressure in the pipe 15 and at the port 65 of the controlling valve falls below 40 pounds, the valve stem 35 will move downwardly closing the communication between the pipes 4 and 5, and the motor will again operate when city or dynamic water is being drawn. Thus as long as the pressure in the soft water line is between 15 and 40 pounds, the pump will not operate unless city water is being drawn. When the pressure falls below 15 pounds, the pump will begin operation and will continue until the pressure again reaches 15 pounds. The water passes to the operating end of the pump by way of the pipe 1, and is discharged by way of the pipe 3 to the city water fixture line 2, or by way of the pipe 8 to the sewer, depending upon the position of the valve 59—60—61. Should the valve 59—60—61 be closed at the commencement of the operation of the pump, it will be gradually opened by the discharge water in the pipes 3 and 7, and the pump will then discharge by way of the pipes 7 and 8 to the sewer, that is, to waste. This will continue until some pressure is attained in the pipe 15, sufficient at least to move the valve stem 53 downward, and to close the valve 59—60—61. Should this valve 59—60—61 be opened at the commencement of the operation no water may be drawn from the city water line until a soft water pressure is obtained of three or four pounds. Since at this time the city water fixture line is empty the three or four pounds of pressure in the pipe 15 and at the port 65 will move the valve stem downwardly to close the valve 59—60 on its seat 62, thus closing the communication between the pipes 7 and 8, and the motor discharge water will pass by way of the pipes 2 and 3 to the city fixture lines. So long as the pressure in the pipe 15 and at the port 65 of the controlling valve is below 40 pounds, the valve 33—34 will remain seated on its seat 69. When the pressure in the pipe 15 reaches 40 pounds, the valve 33—34 is forced open, and the city water now passes by way of the pipes 4 and 5 to the city water fixture line. Whenever the pressure in the pipe 15 is below 15 pounds, the city water is permitted to pass to the motor end of the pump, and discharges through the pipe 3 to the city water fixtures or to the sewer, depending upon other conditions in the system. Were soft and city water being drawn at the same time from the fixtures the valve elements will occupy the position of Fig. 2, that is, the valve 33—34 will remain open, the withdrawal of the water having no effect upon the valve 34—33. The above will obtain when the pressure in the pipe 15 is below 40 pounds.

In the above case, the pump will not operate if the pressure in the pipe 15 is above 40 pounds. If however, the pressure in the pipe is below 40 pounds with these conditions, the pump will operate and the discharge water will pass into the pipe 2, instead of discharging to the sewer. With the pressure at the port 65 of the controlling valve at 40 pounds and the valve 33—34 open, when city water is drawn from the fixture line it will be supplied from the pipe 1 by way of the pipes 4 and 5 to pipe 2. Should the soft water be withdrawn from the fixture line until the pressure at the port 65 is below 40 pounds, and no water is being drawn from the city fixture line 2, the valve 33—34 will close, so that the city water will pass through the motor end of the pump when being used. After the pressure in the soft water line attained 40 pounds and the pump is stopped it will not again operate until the pressure in the pipe 15 and at the port 65 has fallen to 15 pounds unless city water is being used. The only condition under which city water can be drawn from the fixture line with the pressure in the soft water line, that is, in the pipe 15, below 40 pounds without the valve 33—34 closing, is when both city and soft water are being withdrawn from the fixtures simultaneously.

Should city and soft water be running from the fixtures at the same time with the pressure in the pipe 15 below 40 pounds, and should there be a cessation of the running from the soft water line without stopping the run of the city water, the valve 33—34 will close, and the motor will begin to operate, and the city water fixtures will be supplied with water by way of the pipes 3 and 2. Should the withdrawing of the soft water again commence, the valve 33—34 will not open, and the city water will not change its course above mentioned, nor will the motor cease its operation until the pressure at the port 65 again reaches 40 pounds. When the pressure in the pipe 15 is below 15 pounds, the valve 59—61 will stand open, and the discharge water from the motor end of the pump will flow by way of the pipes 7 and 8 to the sewer, and will continue to flow in this manner until the pressure in the pipe 15 again reaches 15 pounds. When this pressure is attained, the valve stem 53 is forced downwardly seating the valve 59—61 and the motor will stop until conditions change. Should the pressure in the pipe 15 stand at 20 pounds, and should then soft water be withdrawn by way of the fixtures, the motor end of the pump will not begin to operate until the pressure in the pipe 15 has been reduced below 15 pounds. When this occurs, the motor will begin its operation. When the soft water pressure is below 40 pounds and above 15 pounds the pump will operate only while the city water is being drawn.

It will be evident that the device in its simplest form may be considered as a valve casing having an intermediate portion and end portions, the intermediate portion being that portion between packing 51 and the inlet port 39, the said intermediate portion having an inlet port 65, each of the end portions being provided with oppositely arranged ports and with a valve between the members of each pair of ports for controlling the communication between the ports, the intermediate portion having a plunger on each side connected to the adjacent valve for operating the same, and the plunger adjacent to one pair of ports being a double plunger operated upon by the pressure from the inlet ports 39 and 65.

The upper plunger controls the by-pass 4—5 from the source of supply, to the fixture supply pipe, so that when this by-pass is open and the pressure in the pipe 1 exceeds the pressure in the pipe 2, the dynamic water, that is, the water under pressure will by-pass without affecting the motor. The lower plunger controls the by-pass from the exhaust of the motor to the sewer, thus controlling the flow of the dynamic water from the motor to the fixture line or to waste.

The system, as a whole, combines two independent sources of water, the water of one source being dynamic and the water of the other source static, wherein a pump passes the static water from the source to a compression tank which in turn passes it on to the fixtures, converting the static water in the tank to dynamic form at the fixtures. The motor which operates the pump is connected with the source of dynamic water and is operated by the said water, and discharges the said water to the fixture line for this water.

The operation of the pump depends upon the condition of the by-pass 4—5, and the disposal of the water from the pump depends upon the condition of the by-pass 7—8. When the by-pass 4—5 is opened, the motor will not operate and the said by-pass is controlled by the pressure in the soft water line, and also by the pressure in the fixture line for the city water.

The compression tank and the pipe 11 may be drained into the cistern by opening the valve 14ª. The pump may be shut off from both water lines by closing the valves 10ª and 18, and the controlling valve may be cut off by closing the valves 6—17 and 18.

It will be understood that the pressure values stated are based on a city water pressure of 65 pounds, and that if the city water pressure is greater or less, the values stated will vary in proportion.

I claim:—

1. In combination with the independent sources of dynamic and static water, and the fixture supply pipes for supplying the said waters to the places of utilization, of a compression tank for receiving the static water and supplying it to the fixture supply pipe, a pump connected with the source of static water for supplying the said water to the compression tank, a water motor connected to the source of dynamic water and operated thereby, and discharging to the fixture supply pipe, the motor being connected to the pump for operating the same, a by-pass pipe leading from the discharge pipe of the motor, and a controlling device for controlling the operation of the motor and having a valve for controlling the by-pass pipe, said controlling device being controlled by the pressure in the static water fixture supply pipe, said controlling device further comprising a casing having an inlet port intermediate its ends, a connection between the said port and the static water fixture supply pipe, a by-pass pipe leading from the dynamic water source to the dynamic fixture supply pipe, a valve for controlling the by-pass pipe, the said valve being at the opposite end of the controlling device from the valve of the first-named by-pass pipe, a plunger in the casing of the controlling device on each side of the inlet port, each plunger being connected to the adjacent valve to operate the said valve, the plunger adjacent to the valve of the last-named by-pass pipe having a head against which the pressure of the water in the by-pass pipe may act.

2. In combination with the independent sources of dynamic and static water, and the fixture supply pipes for supplying the said waters to the place of utilization, of a compression tank for receiving the static water and supplying it to the fixture supply pipe, a pump connected with the source of static water for supplying the said water to the compression tank, a water motor connected to the source of dynamic water and operated thereby, and discharging to the fixture supply pipe, the motor being connected to the pump for operating the same, a by-pass pipe leading from the discharge pipe of the motor, a by-pass between the dynamic water supply for the motor and the dynamic fixture supply pipe between the dynamic source and the motor, a controlling device arranged between the by-pass pipes, said controlling device having a casing, and having a valve for controlling each of the said by-pass pipes, said casing having an inlet port intermediate its ends and connected to the static water fixture supply pipe, a plunger within the casing on each side of the port, each plunger being connected to the adjacent by-pass valve for operating the same, the plunger adjacent to the valve of the last-named by-pass having a head against which the pressure of the water of the by-pass pipe may act.

3. In combination with the independent sources of dynamic and static water, and the fixture supply pipes for supplying the said waters to the place of utilization, of a compression tank for receiving the static water and supplying it to the fixture supply pipe, a pump connected with the source of static water for supplying the said water to the compression tank, a water motor connected to the source of dynamic water and operated thereby, and discharging to the fixture supply pipe, the motor being connected to the pump for operating the same, a by-pass pipe leading from the discharge pipe of the motor, a by-pass between the dynamic water supply for the motor and the dynamic fixture supply pipe between the dynamic source and the motor, a controlling device having a casing and having a valve for each by-pass pipe for controlling the said pipe, said casing having an inlet port intermediate its ends and connected to the static water fixture supply pipe, and a plunger within the casing on each side of the port and connected to the adjacent by-pass valve for operating the same.

4. In combination with the independent sources of dynamic and static water, and the fixture supply pipes for supplying the said waters to the places of utilization, of a compression tank for receiving the static water and supplying it to the fixture supply pipe, a pump connected with the source of static water for supplying the said water to the compression tank, a water motor connected to the source of dynamic water and operated thereby, and discharging to the fixture supply pipe, the motor being connected to the pump for operating the same, a by-pass pipe leading from the discharge pipe of the motor, a by-pass between the dynamic water supply for the motor and the dynamic fixture supply pipe between the dynamic source and the motor, a controlling device having a valve for controlling each of the by-pass pipes, and having a casing connected to the static water fixture supply pipe, a plunger in the casing on each side of the connection and operated by the pressure of the water in the casing, and connected to the adjacent valve of the adjacent by-pass pipe.

5. In combination with the independent sources of dynamic and static water, of a compression tank for receiving the static water and delivering it to the place of utilization, a pump connected with the source of static water and delivering to the compression tank, a water motor connected with the pump for operating the same and connected with the dynamic source and operated by the passage of the dynamic water through the motor and delivering the discharge water to the place of utilization, a by-pass for conducting the dynamic water from the source directly to the place of utilization, a second by-pass for permitting the discharge water of the motor to waste, and a controlling device, said device having a valve for controlling each by-pass, and the said controlling device being connected with the compression tank and being operated by the pressure of the water in the tank, the controlling device having a casing.

6. In combination with the independent sources of dynamic and static water, of a compression tank for receiving the static water and delivering it to the place of utilization, a pump connected with the source of static water and delivering to the compression tank, a water motor connected with the pump for operating the same and connected with the dynamic source and operated by the passage of the dynamic water through the motor and delivering the discharge water to the place of utilization, a by-pass for conducting the dynamic water from the source directly to the place of utilization, a second by-pass for permitting the discharge water of the motor to waste, and a controlling device, said device having a valve for controlling each by-pass, and having a casing provided with an inlet port connected to the tank, and a plunger on each side of the port connected to the adjacent valve of the adjacent by-pass.

7. In combination with the independent sources of dynamic and static water, of a compression tank for receiving the static water and delivering it to the place of utilization, a pump connected with the source of static water and delivering to the compression tank, a water motor connected with the pump for operating the same and connected with the dynamic source and operated by the passage of the dynamic water through the motor and delivering the discharge water to the place of utilization, a by-pass for conducting the dynamic water from the source directly to the place of utilization, a valve for controlling the by-pass, a second by-pass for permitting the discharge water of the motor to waste, a valve for controlling the said second by-pass, and a controlling valve for operating the by-pass valves, said valve being connected with the compression tank and being operated by the pressure of the water in the tank.

8. In combination with the independent sources of dynamic and static water, and the compression tank for receiving the static water and supplying it to the place of utilization, the pump for supplying the static water from the source to the tank and the motor connected with the pump for operating same and connected with the dynamic source for receiving water therefrom to operate the motor and connected to the place of utilization of the dynamic water for delivering the discharged water thereto, of means for controlling the operation of the motor, said means comprising a valve having an inlet port connected with the compression tank, and having transverse passages at the opposite sides of the inlet port, one of the said passages permitting the passage of the dynamic water from the connection between the motor and the source to the connection between the motor and the place of utilization, the other passage permitting the passage of the discharge water from the source to waste, and means within the casing and operated by the pressure in the compression tank for closing the last named passage and for opening the first named passage when the pressure exceeds a predetermined point, and for opening the valves when the pressure falls below a predetermined point, and means in connection with the operating means for the first-named passage and operated by the pressure in the connection between the motor and the place of utilization for closing the first-named valve when the pressure in said connection exceeds a predetermined point.

9. In combination with the independent sources of dynamic and static water, and the compression tank for receiving the static water and supplying it to the place of utilization, the pump for supplying the static water from the source to the tank, and the motor connected with the pump for operating the same and connected with the dynamic mic source for receiving water therefrom to operate the motor and connected to the place of utilization of the dynamic water for delivering the discharged water thereto, of means for controlling the operation of the motor, said means comprising a valve having an inlet port connected with the compression tank, and having transverse passages at the opposite sides of the inlet port, one of the said passages permitting the passage of the dynamic water from the connection between the motor and the source to the connection between the motor and the place of utilization, the other passage permitting the passage of the discharge water from the source to waste, and means within the casing and operated by the pressure in the compression tank for opening the first-named valve and for closing the last-named valve when the pressure exceeds a predetermined point.

10. In combination with the independent sources of dynamic and static water, and the compression tank for receiving the static water and supplying it to the place of utilization, the pump for supplying the static water from the source to the tank, and the motor connected with the pump for operating the same, and connected with the dynamic source for receiving water therefrom to operate the motor, and connected to the place of utilization of the dynamic water for delivering the discharged water thereto, of means for controlling the operation of the motor, said means comprising a valve having an inlet port connected with the compression tank, and having transverse passages at the opposite sides of the inlet port, one of the said passages permitting the passage of the dynamic water from the connection between the motor and the source to the place of utilization, the other passage permitting the passage of the discharge water from the source to waste, and means within the casing and operated by the pressure in the compression tank for closing the second named passage and opening the first named passage when the pressure in the tank exceeds predetermined points, and for permitting the said open passage to close and the said closed passage to open when the pressure in the tank falls below predetermined points, and means in connection with the pressure operated means and operated by the pressure in the connection between the motor and the place of utilization for closing the first named passage when the pressure in the said connection exceeds a predetermined point.

11. In combination with the independent sources of dynamic and static water, and the compression tank for receiving the static water and supplying it to the place of utilization, the pump for supplying the static water from the source to the tank, and the motor connected with the pump for operating the same, and connected with the dynamic source for receiving water therefrom to operate the motor, and connected to the place of utilization of the dynamic water for delivering the discharged water thereto, of means for controlling the operation of the motor, said means comprising a valve having an inlet port connected with the compression tank, and having transverse passages at the opposite sides of the inlet, one of the said passages permitting the passage of the dynamic water from the connection between the motor and the source to the connection between the motor and the place of utilization, the other passage permitting the passage of the discharge water from the source to waste, and means within the casing and operated by the pressure in the compression tank for opening the first named passage and closing the second when the pressure in the tank exceeds predetermined points.

HOWARD FIELDER.

Witnesses:
C. E. TRAINOR,
D. W. FIELDER.

Copies of this patent may be obtained for five cents each, by addressing the "Commissioner of Patents, Washington, D. C."